United States Patent [19]

DiBartolo

[11] Patent Number: 4,630,640

[45] Date of Patent: Dec. 23, 1986

[54] PRESSURE COMPENSATED RESTRICTIVE FLOW REGULATOR CARTRIDGE

[75] Inventor: Ernest A. DiBartolo, Sarasota, Fla.

[73] Assignee: Sun Hydraulics Corp., Sarasota, Fla.

[21] Appl. No.: 743,293

[22] Filed: Jun. 10, 1985

[51] Int. Cl.⁴ .......................................... F16K 31/363
[52] U.S. Cl. .................................................. 137/501
[58] Field of Search ............... 137/500, 501, 503, 220, 137/502, 508

[56] References Cited

U.S. PATENT DOCUMENTS

| | | | |
|---|---|---|---|
| 3,402,735 | 9/1968 | Kates | 137/501 |
| 3,643,685 | 2/1972 | Hays | 137/501 |
| 3,825,032 | 7/1974 | Peruglia | 137/501 X |
| 4,074,693 | 2/1978 | Kates | 137/501 X |
| 4,237,922 | 12/1980 | Maier | 137/501 X |
| 4,250,915 | 2/1981 | Rikuta | 137/503 X |
| 4,495,794 | 1/1985 | Takada et al. | 137/503 X |

FOREIGN PATENT DOCUMENTS

| | | | |
|---|---|---|---|
| 2358710 | 12/1974 | Fed. Rep. of Germany | 137/220 |
| 2609756 | 4/1977 | Fed. Rep. of Germany | 137/508 |
| 603812 | 6/1948 | United Kingdom | 137/503 |

Primary Examiner—Martin P. Schwadron
Assistant Examiner—Stephen M. Hepperle
Attorney, Agent, or Firm—Charles J. Prescott; Raymond H. Quist

[57] ABSTRACT

A flow regulator valve has a first fluid opening at one end and a second fluid opening at the side of the valve body. A sleeve bore extends from the first opening and contains a stem which is co-axial with the sleeve bore, but spaced from it. A compensating spool is slideably mounted between the sleeve bore and the stem and may move to completely close the second opening or to provide partial opening. A control spring biases the spool to the open position, but a fluid passage through the stem wall permits the pressure of the fluid at the first opening to be applied to bias the spool to the closed position. A valve element containing an orifice establishes the nominal flow rate desired, while the pressure drop across the spool causes it to assume a position to maintain the desired flow rate. A valve element control spring may be used to maintain the valve element in the "off" position until the pressure rises to a desired threshold. Venting of the cavity in which the valve element is located is provided.

18 Claims, 4 Drawing Figures

PRESSURE COMPENSATED RESTRICTIVE FLOW REGULATOR CARTRIDGE

BACKGROUND OF THE INVENTION

1. Field of the Invention

This invention relates generally to adjustable, pressure compensated, restrictive flow regulator valves, and more particularly to a restrictive flow regulator cartridge having improved pressure compensation.

2. Description of the Prior Art

Restrictive flow regulator valves are widely used in the fluid power industry in applications where speed control, independent of pressure drop, is required. Speed control is achieved when the unit flow through the valve in terms of volume per time period remains constant.

In its simplest form, a valve of this type consists of a flow control orifice, a compensating spool and a control spring, all contained in a suitable housing or valve body. Flow through the valve from port A (the inlet port) to port B (the outlet port) creates a pressure drop across the orifice. The magnitude of the pressure drop for a given flow control orifice opening depends, primarily, upon the flow rate. This pressure drop is applied across the compensating spool and tends to cause it to move in a direction to restrict flow through port B, the outlet port. This tendency of the spool to move to restrict flow is opposed by the control spring. Ideally, the flow will not be restricted by the spool until it has reached a high enough rate so that the force due to the pressure drop is greater than the control spring force. At this time the spool should move to restrict flow and maintain a constant pressure drop across the orifice.

A problem associated with currently available valves of this type is that before flow begins they are normally open because the force applied by the control spring against the compensating spool is unopposed. At the start of flow, the only resistance to flow is that afforded by the flow control orifice. As a result there is an initial surge in fluid flow until, after a finite time, the force due to the pressure drop takes effect, causing the spool to shift against the control spring and regulate the pressure drop across the orifice. This initial surge is an undesirable effect in a valve which is intended to provide a controlled and constant flow rate at all times.

It is therefore an object of this invention to provide a restrictive flow regulator valve in which control of flow is provided from the moment pressure is applied.

It is also an object of this invention to provide a pressure compensated restrictive flow regulator valve in a cartridge form.

It is a further object of this invention to provide a pressure compensated restrictive flow regulator valve which may be fully adjusted to a desired flow rate between shutoff and full open maximum.

It is also an object of this invention to provide a pressure compensated restrictive flow regulator valve which is of a normally closed configuration.

It is also an object of this invention to provide a pressure compensated restrictive flow regulator valve having a free reverse flow configuration.

SUMMARY OF THE INVENTION

A pressure compensated restrictive flow regulator valve has an orifice which is used to set the desired flow rate at a nominal pressure. Because the pressure at the inlet port will vary, a compensating spool is provided to control the opening of radial passages leading to the outlet port. The position of the compensating spool is established by the balance of four applied forces. The forces which tend to increase the passage openings are provided by a control spring and fluid pressure in the control spring cavity exerted against an annular area of the spool. The forces which tend to decrease the passage openings are provided by a check spring and fluid pressure in the check spring cavity exerted against an annular area of the spool. A normally closed configuration is provided in which the control orifice element is also provided with a control spring which will close the orifice until fluid pressure of sufficient magnitude is applied to open it. An orifice in the passage leading to the valve element control spring cavity provides additional control. The normally closed configuration is provided in an embodiment in which the valve orifice is adjustable, and an embodiment in which the valve orifice is fixed. The valves have a cartridge configuration and a free reverse flow feature.

DETAILED DESCRIPTION OF THE INVENTION

Figure 1:
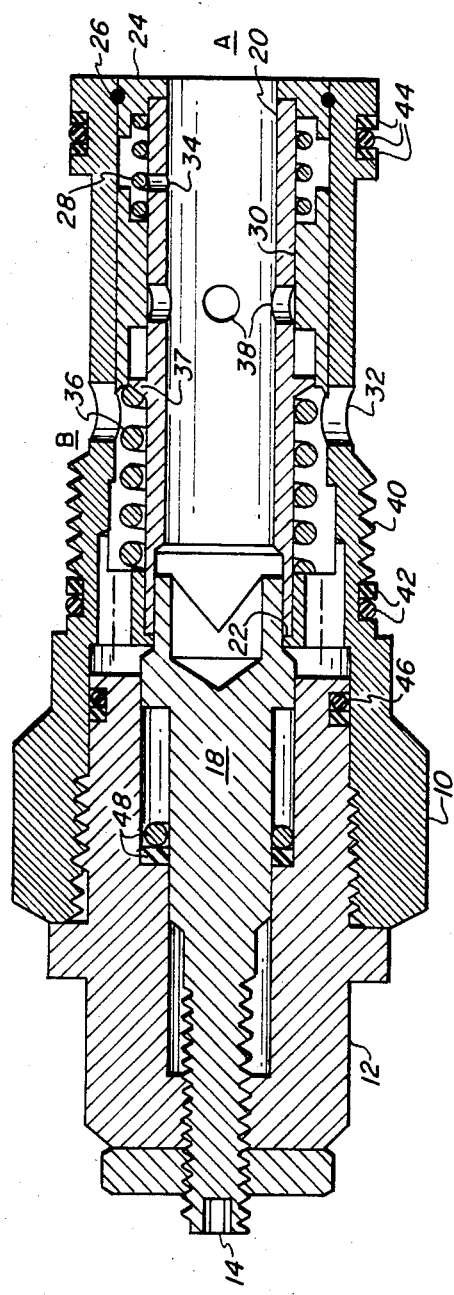
FIG. 1 is a cross-section of a side view of a pressure compensated, restrictive flow regulator cartridge in accordance with the invention.

Referring to FIG. 1, valve body 10 has secured thereto by threads or any other convenient arrangement, plug 12 containing adjusting screw 14. Adjusting screw 14 has at its inner end valve element 18. Valve element 18 may be of any desired configuration to provide, in cooperation with inner stem 20, a control orifice which can be adjusted by moving adjusting screw 14 in or out. This method of changing the orifice opening is only one example. For example, the orifice opening might be changed by rotating it. The valve is illustrated with adjusting screw 14 in the fully closed position.

Inner stem 20 is fixed in position at its inner end by shoulder 22 of valve body 10, and at its outer end by spring end 24. Spring end 24 is secured to body 10 by retainer 26 which may be a retainer wire as shown.

Spring end 24 also has a shoulder to support one end of check spring 28. Check spring 28 has its other end bearing against compensating spool 30 which is slidably mounted within valve body 10. Spool 30 is biased by check spring 28 to prevent it from moving to open radial passages 38 through stem 20. Spool 30 also has an annular area between valve body 10 and inner stem 20 at its check spring end which will bias it to close radial passages 32 under the influence of fluid pressure. Fluid has free access to the cavity in which this annular area is positioned through passage 34.

The opposite end of compensating spool 30 is biased to move to open radial passages 32 by control spring 36 which is positioned against an annular portion of spool 30. It should be noted that control spring 36 will be stopped by shoulder 37 of stem 20 from moving spool 30 past the position shown in FIG. 1. Check spring 28 is therefore able to position spool 30 as shown.

Control spring 36 is supported at its other end by the portion of valve body 10 which includes shoulder 22. Compensating spool 30 functions to compensate for pressure variations so as to maintain a constant flow rate.

The opening of radial passages 38 in inner stem 20 is controlled by the position of spool 30. When spool 30 moves to open passages 38 a more direct passage is provided between inner stem 20 and port B than the passage which includes the control orifice provided by valve element 18 in cooperation with inner stem 20.

Control spring 36 is selected to have a greater spring force than check spring 28 so that, in the absence of fluid pressure, spool 30 will be positioned to leave radial passages 32 to port B open.

The valves of this invention are in cartridge form, i.e. they are designed to be screwed into a manifold which provides appropriate passages for fluid. Valves having the same external dimensions, but different internal sizes or configurations may be substituted merely by unscrewing one cartridge and screwing in a different one. Threads 40 provide this screw-in capability. Seal 42, consisting of an O-ring and a backup ring; and seal 44, consisting of an O-ring with backup rings on either side, are provided on the exterior of the cartridge; and seals 46 and 48 are used to prevent leakage from the interior of the cartridge.

In operation, application of fluid pressure at port A will result in flow through the orifice provided by valve element 18 and inner stem 20 to radial passages 32 and port B. Fluid will also be admitted through passage 34 to add fluid pressure to the spring force of check spring 28 against the annular area of spool 30. The flow through the orifice results in a pressure drop so that the fluid pressure on the control spring side of spool 30 is less than that on the check spring side. The force exerted by control spring 36 prevents spool 30 from moving to close radial passages 32 until sufficient pressure drop is established across the control orifice. As flow increases, the pressure drop across the orifice and, therefore, compensating spool 30 also increases until the pressure drop force on the compensating spool exceeds the installed force of control spring 36. Compensating spool 30 will now move against the force of control spring 36 to close radial passages 32 enough to maintain a constant pressure drop through the control orifice. This, in turn, results in constant flow through the valve. Thus, a balance of forces is achieved to permit only the preset desired amount of metered flow through the cartridge.

When flow is reversed, i.e. from port B to port A, the pressure drop across spool 30 is in the opposite direction so that pressure in the control spring cavity is higher than that in the check spring cavity. This higher fluid pressure exceeds the opposing check spring force on spool 30 so that spool 30 will move to open passages 38 through inner stem 20 allowing free flow from port B to port A. As previously mentioned, shoulder 37 of inner stem 20 prevents control spring 36 from contributing to the opening of passages 38.

Figure 2:
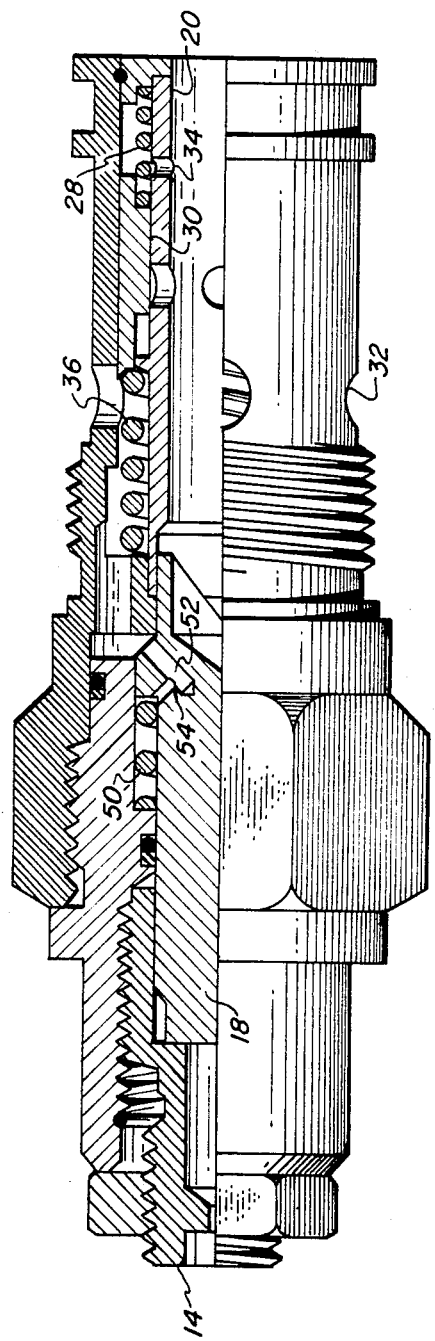
FIG. 2 is a cross-section of a side view of a normally closed configuration of the cartridge of FIG. 1.

Referring next to FIG. 2, a normally closed configuration of the pressure compensated restrictive flow regulating cartridge of FIG. 1 is illustrated. The changes relate to valve element 18, which in this embodiment is equipped with valve element control spring 50 and passage 52 containing orifice 54.

Adjusting screw 14, in this embodiment, is not attached to the stem of valve element 18, but it provides a limit, which can be adjusted, to the size of the orifice which results when valve element 18 moves from its closed position in inner stem 20. (As shown, adjusting screw 14 is in the fully closed position.) Valve element 18, in the absence of fluid pressure on the cartridge, is held in its closed position by the spring force of valve element control spring 50. Consequently when fluid pressure is first applied at port A, no fluid will pass through valve element 18 and radial passages 32 to port B. In other words, the valve is in a zero flow condition (off) at the initiation of fluid pressure. This condition is diametrically opposite to contemporaneously available pressure compensated flow regulator valves which permit a surge of fluid flow at the initial application of fluid pressure. Fluid is freely admitted through passage 34 to the cavity containing check spring 28 to bias spool 30 to close radial passages 32 to port B. The force of check spring 28 may be so low as to be substantially negligible. In order for this spool movement to occur, it is necessary that the force of control spring 36, in terms of pressure drop, be less than that of valve element control spring 50 so that a delay is introduced before fluid pressure builds up in the cavity containing control spring 36. The spring force of valve element control spring 50 is used to hold off the force exerted by fluid pressure against the valve element seat area to provide this delay until the fluid pressure within inner stem 20 builds sufficiently high to over come this spring force. Therefore, even when valve element 18 is finally forced back to the limit permitted by adjusting screw 14, radial passages 32 will be closed by spool 30. Only when pressure builds sufficiently in the control spring cavity, will spool 30 begin to move to open radial passages 32. Thus flow builds gradually from zero to the amount preset without detrimental surges. Once this opening sequence is completed, the pressure compensation is as described with the FIG. 1 embodiment.

It can be seen also that varying the position of adjusting screw 14 will change the distance valve element 18 can move before it abuts the adjusting screw and movement is stopped. The further the adjusting screw is moved away from the valve seat, the greater the orifice area which will result upon opening, increasing controlled flow.

Passage 52 will admit fluid to the cavity containing valve element control spring 50. Orifice 54 provides an additional control over the rate at which the cartridge opens by restricting fluid flow out of the cavity containing valve element control spring 50. It will be noted that the cavity in which valve element 18 is contained is vented to atmosphere. This permits valve element 18 to remain in an open position after pressure in the control spring cavity has risen sufficiently for spool 30 to perform its modulating or compensating function.

Figure 3:
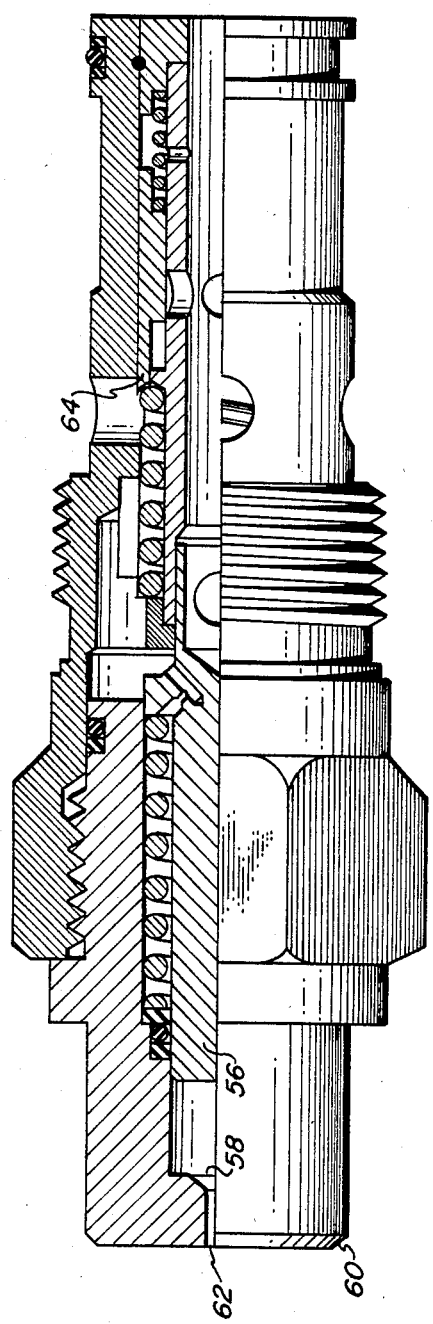
FIG. 3 is a cross-section of a side view of a non-adjustable version of the cartridge of FIG. 2.

Turning now to FIG. 3, a simplified version of the normally closed cartridge of FIG. 2 will be described. The FIG. 3 embodiment is non-adjustable, a feature which is useful to prevent unauthorized change of the valve orifice size. It may also be somewhat less expensive to fabricate. Valve element 56 has a poppet configuration and is limited in its opening travel by wall 58 of plug 60. Passage 62 through wall 60 provides a reference to atmosphere which permits valve element 56 to remain in the open position once pressure downstream from the orifice has risen sufficiently to cause spool 64 to move to the modulating or compensating position.

Valve element 56 in the FIG. 3 embodiment is shown as having a circular control orifice, in general, however, an orifice having a fixed opening of any form rather than a variable sized opening is used for this configuration. With this arrangement, the orifice area is determined by diameter rather than by adjusting the stroke.

Figure 4:
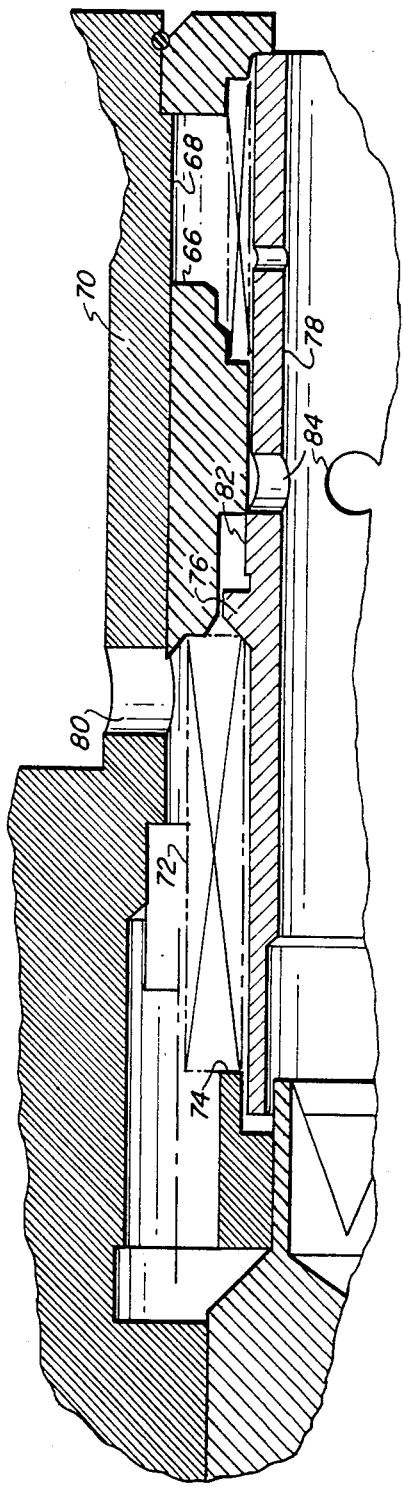
FIG. 4 is a detail of the cartridge configuration showing manufacturing features.

It should be appreciated that the structure of the valves of this invention depends for proper operation on free, nonbinding, movement of the compensating spool between the valve body and the inner stem which are both fixed. If loose fits are used to assure this free movement, internal leakage would result. Internal leakage normally results in control flow inaccuracy and an inability to control low flows. The construction embodied in this design completely overcomes these problems and provides typical precision spool-to-sleeve leakage characteristics along with smooth, stiction-free motion. Referring to FIG. 4, a detail of the valve structure in the off position is portrayed, ("off" in this context means pressure drop is insufficient to cause opening of the valve orifice). Spool 66 is precisely fitted to sleeve 68 of valve body 70. This fit is typically achieved by grinding the outside diameter of spool 66 and honing the sleeve bore to fit. This close fit (0.0003–0.0006 inches in practice) is important because the full pressure drop, often in excess of 3000 psi, takes place across the length of the spool outside diameter. In the off position shown, all of the force of control spring 72 is taken by shoulder 74 of valve body 70 at one end, and by the enlarged annular portion 76 of stem 78 at the other end. The inside diameter of spool 66 does not touch stem 78 because of the clearance fit which exists with the spool in this position. Spool 66 is not subject to binding which can be caused by inaccuracies resulting from lack of concentricity or squareness among the three coaxial parts when all three are made to fit tightly.

During use, when spool 66 is compensating for pressure changes by moving to decrease and increase the openings of radial ports 80, control spring 72 no longer bears against the annular portion 76 of stem 78. Instead it bears against compensating spool 66. Stem 78 is then essentially in hydraulic balance and is free to assume any radial position, dictated by its close fit with stem 78 at area 82 and limited only by ample clearances at each end between its outer diameter and the adjacent members. Spool 66 has its inner diameter honed to fit the enlarged diameter 82 of stem 78. This close fit prevents leakage directly from stem 78 through openings 84 to the control spring cavity. Spool 66 easily engages the close fitting portion 82 of stem 78 because stem 78 is hydraulically balanced and has ample radial clearance at each end. In this manner, extremely close fits can be achieved at both inside and outside diameters among three coaxially cooperating parts with no resulting friction and without employing expensive manufacturing techniques.

I claim:

1. A flow regulator cartridge for use in a manifold having fluid passages forming fluid ports which cooperate with valve openings, said cartridge comprising:
   a valve body having a first portion to be disposed in the manifold and a second portion to be extended from the manifold;
   means for sealingly securing said valve body in the manifold;
   said valve body having an opening to port A at the end of said portion to be disposed in the manifold and an opening to port B on the side of said portion to be disposed in the manifold;
   a stem longitudinally extending in said valve body from an outer end at port A to an inner end, providing a fluid passage therethrough;
   a valve element providing a preset flow control orifice between said inner end of said stem and port B;
   a compensating spool slideably mounted to control the opening to port B;
   said compensating spool having a first annular area which will bias it, under the influence of fluid pressure, to decrease the opening to port B;
   first passage means through the wall of said stem for admitting fluid from port A to exert fluid pressure against said first annular area of said compensating spool;
   second passage means through the wall of said stem for admitting fluid from port B to said stem;
   said compensating spool closing said second passage means when the fluid pressure at port A is greater than the fluid pressure at port B, and opening said second passage means when the fluid pressure at port B is greater than the fluid pressure at port A;
   said compensating spool having a second annular area which will bias it, under the influence of fluid pressure, to increase the opening to port B; and
   a control spring biasing said compensating spool to increase the opening to port B.

2. A flow regulator valve in accordance with claim 1 wherein:
   said preset flow control orifice is fully adjustable.

3. A flow regulator valve in accordance with claim 1 wherein:
   said preset flow control orifice is fixed.

4. A flow regulator valve in accordance with claim 1 wherein:
   said opening to port B is a plurality of passages through said valve body.

5. A flow regulator valve in accordance with claim 4 wherein:
   said plurality of passages are radial.

6. A flow regulator valve in accordance with claim 1 further including:
   a check spring biasing said compensating spool to close said second passage means through said stem.

7. A flow regulator valve in accordance with claim 1 wherein:
   said stem in the portion co-extensive with the range of movement of said spool, has a spool engaging area and a spool clearance area; and
   while said spool is in said spool engaging area, said stem will have a loose clearance at all other outer diameter along its length.

8. A flow regulator valve in accordance with claim 1 further including:
   a valve element control spring biasing said control element to the off position.

9. A flow regulator valve in accordance with claim 8 further including:
   a valve element cavity in which said valve element is contained; and
   a vent connecting said valve element cavity with the atmosphere.

10. A flow regulator valve in accordance with claim 8 further including:
   a valve element control spring cavity in which said valve element control spring is contained; and
   a passage connecting said valve element control spring cavity with the port B side of the valve element.

11. A flow regulator valve in accordance with claim 10 wherein:
said passage connecting said valve element control spring cavity with the port B side of the valve element contains an orifice.

12. A flow regulator cartridge in accordance with claim 1 wherein:
said means for sealingly securing said valve body in the manifold are threads on the exterior of said valve body on said first portion, and a seal.

13. A flow regulator valve comprising:
a valve body having a sleeve bore therein open at one end and a passage through the side of said valve body;
a hollow stem contained in said valve body coaxial with said sleeve bore but spaced therefrom;
said stem providing a passage into said valve body from said one end of said sleeve bore;
retaining means at one end of said sleeve bore preventing said stem from moving out of said sleeve bore;
a valve element providing a preset flow control orifice between said stem and said passage through the side of said valve body;
a compensating spool slideably mounted between said sleeve bore and said stem to control the opening of said passage through the side of said valve body;
said compensating spool having a first annular area which will bias it, under the influence of fluid pressure, to decrease the opening of said passage through the side of said valve body;
passage means for admitting fluid from said stem to exert pressure against said first annular area of said compensating spool;
said compensating spool having a second annular area which will bias it, under the influence of fluid pressure, to increase the opening of said passage through the side of said valve body;
a control spring supported at one end by said valve body;
said control spring biasing said spool to increase the opening of said passage through the side of said of valve body only until said control spring reaches the limit of its extension;
a shoulder on said stem limiting extension of said control spring and causing said stem to be urged against said retaining means in the absense of a predetermined pressure drop across said spool;
said control spring biasing said compensating spool to increase the opening of said passage through the side of said valve body within the limit of its extension;
said stem having a spool engaging surface which will engage said spool in the presence of at least the predetermined pressure drop; and
a passage through the wall of said stem between said retaining means and said compensating spool.

14. A flow regulator cartridge comprising:
a valve body having a first portion to be disposed in a manifold and a second portion to be extended from the manifold;
said valve body having means for sealingly securing it in the manifold;
said valve body having a first opening at the end of the portion to be disposed in the manifold and a second opening at the side of the portion to be disposed in the manifold;
a sleeve bore extending from said first opening;
a stem co-axial with but spaced from said sleeve bore;
a valve element having an orifice movable from an off position in which no fluid will pass therethrough and an open position in which said orifice will determine the flow of fluid therethrough, located between said first and second openings;
said stem providing a passage for fluid between said first opening and said valve element orifice, whereby when said orifice is in said open position a fluid passage will be open from said first opening, through said stem and through said orifice to said second opening;
a compensating spool slideably mounted between said sleeve bore and said stem, having a close fit with said sleeve bore and moveable to a position in which it will completely close said second opening;
said stem having a spool engaging area and a spool clearance area, and said stem having a loose clearance at all other outer diameters along its length when said spool is in said spool engaging area;
said compensating spool having a first annular area which will bias it, under the influence of fluid pressure, in the direction to decrease said second opening;
a control spring biasing said compensating spool to open said second opening;
a first passage through the wall of said stem to admit fluid from said stem to exert pressure against said first annular area of said compensating spool; and
said compensating spool having a second annular area, which will be exposed to fluid at the pressure at said second opening, which will bias it, under the influence of fluid pressure, in the direction to increase said second opening.

15. A flow regulator cartridge in accordance with claim 14 further including:
a valve element control spring biasing said control element to the off position.

16. A flow regulator cartridge in accordance with claim 14 wherein:
the size of said orifice is fixed.

17. A flow regulator cartridge in accordance with claim 14 wherein:
the size of said orifice is adjustable.

18. A flow regulator cartridge in accordance with claim 14 further including:
a second passage through the wall of said stem to admit fluid from said second opening to said stem when the pressure of the fluid at said second opening is greater than the pressure of the fluid at said first opening.

* * * * *